United States Patent
Lang et al.

(10) Patent No.: US 12,241,547 B2
(45) Date of Patent: Mar. 4, 2025

(54) METHOD AND CONTROL APPARATUS FOR OPERATING A TRANSMISSION OF A MOTOR VEHICLE

(71) Applicant: ZF Friedrichshafen AG, Friedrichshafen (DE)

(72) Inventors: Ulf Lang, Aidlingen (DE); Jürgen Blaser, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/545,135

(22) Filed: Dec. 19, 2023

(65) Prior Publication Data
US 2024/0200652 A1 Jun. 20, 2024

(30) Foreign Application Priority Data
Dec. 20, 2022 (DE) ...................... 10 2022 214 070.2

(51) Int. Cl.
*F16H 61/70* (2006.01)
*F16H 47/08* (2006.01)
(Continued)

(52) U.S. Cl.
CPC ......... *F16H 61/0403* (2013.01); *F16H 47/08* (2013.01); *F16H 59/40* (2013.01);
(Continued)

(58) Field of Classification Search
CPC ...... F16H 61/0403; F16H 47/08; F16H 59/40; F16H 59/54; F16H 59/72; F16H 61/682;
(Continued)

(56) References Cited

U.S. PATENT DOCUMENTS 4,579,015 A  4/1986  Fukui
4,616,521 A  10/1986  Akashi et al.
(Continued)

FOREIGN PATENT DOCUMENTS

DE  10 2011 076 964 A1  12/2012
DE  102014216245 A1 * 2/2016 ......... F16H 61/0403
(Continued)

OTHER PUBLICATIONS

English translation DE2011076964A1; http://translationportal.epo.org; Jun. 11, 2024 (Year: 2024).*
(Continued)

*Primary Examiner* — Roger L Pang
(74) *Attorney, Agent, or Firm* — Finch & Maloney PLLC

(57) ABSTRACT

A transmission is between a drive aggregate and a drive output of a vehicle drivetrain and includes a hydrodynamic starting element and a powershiftable main transmission having a plurality of forward gears and at least one reversing gear. The main transmission has frictional shifting elements, where in each gear a first number of shifting elements are closed and a second number of shifting elements are open. A downstream range group is connected downstream from the main transmission and has at least one interlocking shifting element that can be shifted between first a second driving ranges. With the drive aggregate running, the motor vehicle at a standstill or nearly so, and the main transmission in neutral, a shift request to change the downstream range group is received. The shifting elements of a reversing gear are at least partially closed, and the driving range of the downstream range group is then changed.

14 Claims, 4 Drawing Sheets

(51) Int. Cl.
*F16H 59/40* (2006.01)
*F16H 59/54* (2006.01)
*F16H 59/72* (2006.01)
*F16H 61/04* (2006.01)
*F16H 61/682* (2006.01)
*F16H 59/68* (2006.01)

(52) U.S. Cl.
CPC .............. *F16H 59/54* (2013.01); *F16H 59/72* (2013.01); *F16H 61/682* (2013.01); *F16H 61/70* (2013.01); *F16H 2059/6823* (2013.01); *F16H 2061/047* (2013.01); *F16H 2061/0474* (2013.01)

(58) Field of Classification Search
CPC ....... F16H 2059/6823; F16H 2061/047; F16H 2061/0474; F16H 61/70; F16H 61/702; F16H 61/705
USPC .............................. 701/58, 60, 66; 74/336 R
See application file for complete search history.

(56) References Cited

U.S. PATENT DOCUMENTS

| | | | |
|---|---|---|---|
| 4,637,278 A | 1/1987 | Nishikawa et al. | |
| 4,700,819 A | 10/1987 | Nishikawa et al. | |
| 6,128,974 A * | 10/2000 | Hughes | F16H 61/702 74/336 R |
| 6,463,823 B2 * | 10/2002 | Walker | F16H 61/702 74/335 |
| 6,732,601 B2 | 5/2004 | Suzuki | |
| 8,418,575 B2 | 4/2013 | Schneider et al. | |
| 8,869,642 B2 | 10/2014 | Maurer | |
| 2014/0171263 A1 * | 6/2014 | Steinborn | B60W 10/04 477/79 |
| 2023/0175583 A1 * | 6/2023 | Blaser | F16H 61/702 74/335 |

FOREIGN PATENT DOCUMENTS

| | | |
|---|---|---|
| DE | 10 2019 209 640 A1 | 1/2020 |
| DE | 102022214068 B3 * | 3/2024 |

OTHER PUBLICATIONS

English translation DE102014216245A1; http://translationportal.epo.org; Jun. 12, 2024 (Year: 2024).*
German Patent Office, Office Action issued in German patent application No. 10 2022 214 068.0 (Jul. 28, 2023).
German Patent Office, Office Action issued in German patent application No. 10 2022 214 070.2 (Jul. 28, 2023).
German Patent Office, German Office Action issued in German patent application No. 10 2022 214 070.2 (Jul. 28, 2023).

* cited by examiner

|    | A | B | C | D | E |
|----|---|---|---|---|---|
| D1 | ● | ● | ● |   |   |
| D2 | ● | ● |   |   | ● |
| D3 |   | ● | ● |   | ● |
| D4 |   | ● |   | ● | ● |
| D5 |   | ● | ● | ● |   |
| D6 |   |   | ● | ● | ● |
| D7 | ● |   | ● | ● |   |
| D8 | ● |   |   | ● | ● |
| R  | ● | ● |   | ● |   |

METHOD AND CONTROL APPARATUS FOR OPERATING A TRANSMISSION OF A MOTOR VEHICLE

RELATED APPLICATIONS

This application claims the benefit of and right of priority under 35 U.S.C. § 119 to German Patent Application no. 10 2022 214 070.2, filed on 20 Dec. 2022, the contents of which are incorporated herein by reference in its entirety.

FIELD OF THE DISCLOSURE

The invention relates to a method for operating a transmission which is arranged in a drivetrain of a motor vehicle between a drive aggregate and a drive output. Furthermore, the invention relates to a control unit designed to carry out the method, and to a corresponding computer program for implementing the method on the said control unit. In addition, the invention relates to a transmission and to a motor vehicle with a transmission.

SUMMARY

A drivetrain of a motor vehicle comprises a drive aggregate and a transmission connected between the drive aggregate and a drive output. The transmission converts rotation speeds and torques, and thus supplies the drive output with a traction force. Between the drive aggregate and the transmission there can be connected a hydrodynamic starting element with a converter and a converter bridging clutch.

From prior practice it is already known that the transmission can be made in the form of a group transmission. A group transmission comprises a main transmission also known as the main group. The main transmission serves to provide a number of frictional forward gears and at least one frictional reversing gear. The main transmission can be powershiftable and in that case comprises a plurality of frictional shifting elements. Downstream from the main transmission or main group is connected a downstream range group, which is connected between the output shaft of the main transmission and the drive output.

If, while the motor vehicle is at rest, the downstream range group is to be shifted, then, according to the prior art, the main transmission is first shifted to neutral, and the downstream range group is likewise shifted from the driving range to be disengaged into neutral.

In that situation, owing to drag losses in the powershiftable main transmission, the output shaft of the main transmission can be accelerated, and this to a rotation speed which then no longer allows the downstream range group, starting from neutral, to be shifted into the driving range to be engaged. The driver would then have to switch off the drive aggregate in order to shift the downstream range group into the driving range to be engaged. If the downstream gear box is a hydraulically shifted one, then when the drive aggregate is switched off there is no longer sufficient hydraulic pressure to shift the downstream range group.

Accordingly, there is a need for a method and a control unit for operating a transmission, with the help of which reliable shifting of the downstream range group can be enabled.

DE 10 2011 076 964 A1 discloses a method for operating a motor vehicle with a drive aggregate and a transmission connected between the drive aggregate and a drive output. In this case the transmission is in the form of a group transmission with a powershiftable main transmission and a claw-shifted downstream range group. A hydrodynamic starting element is connected between the main transmission and the drive aggregate. DE 10 2011 076 964 A1 relates to a method for shifting the downstream range group while the motor vehicle is driving, and this in combination with carrying out a gearshift in the powershiftable main transmission.

Starting from there, the purpose of the present invention is to provide a new type of method and a control unit for operating a transmission arranged in a drivetrain of a motor vehicle between a drive aggregate and a drive output.

From a process-technological standpoint, this objective is achieved by the features of a method disclosed herein. A control unit designed to carry out the method is also disclosed. Finally, a computer program for carrying out the method on a control unit of that type and a transmission with such a control unit and a motor vehicle with such a transmission is further disclosed. Advantageous further developments will be apparent in light of the present disclosure.

According to the present invention, a method for operating a transmission which is arranged in a drivetrain of a motor vehicle between a drive aggregate and a drive output is proposed. The transmission comprises a hydrodynamic starting element and a powershiftable main transmission, which provides a plurality of forward gears and at least one revering gear. The hydrodynamic starting element can for example be in the form of a hydrodynamic torque converter with a converter bridging clutch.

The powershiftable main transmission comprises a plurality of frictional shifting elements, of which in each gear a first number of shifting elements are closed and a second number of shifting elements are open. The frictional shifting elements can be in the form of disk clutches and/or disk brakes. The shifting elements can be designed to be actuated by a pressure medium, for example hydraulically or pneumatically. In particular, as the pressure medium, the lubricant of the vehicle's transmission is used. The actuation of the shifting elements can be controlled by a control unit, preferably in the form of a transmission control unit. Thus, the control unit actuates the frictional shifting elements as the situation demands.

The motor vehicle can for example be a passenger car or a utility vehicle such as a truck or an omnibus. The motor vehicle can also be a rail vehicle or an agricultural vehicle.

The transmission also comprises a downstream range group connected downstream from the powershiftable main transmission. Such a downstream range group can be a transmission group of the transmission which can serve to provide a slow driving range and a fast driving range. The downstream range group can also be in the form of a splitter transmission and serve to provide an all-wheel driving range and a non-all-wheel driving range. The downstream range group can also be in the form of a so-termed split-shaft distributor transmission, by means of which the power of the drive aggregate can be transmitted to one or more ancillary aggregates of the motor vehicle.

The downstream range group comprises at least one interlocking shifting element, by means of which the downstream range group can be shifted between a first driving range and a second driving range. The interlocking shifting element can for example be a claw-type shifting element. The interlocking shifting element or claw shifting element can be of the unsynchronized type. In particular the interlocking shifting element can be a shifting clutch.

The interlocking shifting element can be adjusted by means of an adjustment device, which can be in the form of a shift actuator. The shift actuator can be in the form of a hydraulically or pneumatically operated actuating cylinder or an electrical actuator, by means of which a shifting mechanism of the downstream range group is actuated in order to adjust the interlocking shifting element during a gearshift process.

When, with its drive aggregate running, the motor vehicle is at rest or nearly at rest, the powershiftable main transmission is in neutral, and when there is a shift request to switch the downstream range group, according to the invention it is provided that in the main transmission shifting elements which are assigned to a reversing gear of the main transmission are at least partially closed. Thereafter, the downstream range group is switched by actuating the interlocking shifting element of the downstream range group.

The shift request to switch the downstream range group can be triggered manually by the driver of the motor vehicle, or automatically by the control unit, for example.

Shifting of the downstream range group is preferably understood to mean a process in which a shifting element half of the interlocking shifting element, in particular a shifting sleeve, is brought into functional connection with or separated from a second shifting element half of the interlocking shifting element, in particular a clutch body of a gearwheel. Thus, switching of the downstream range group can be understood to mean shifting out of one driving range into another driving range, shifting out of a driving range into neutral, and shifting out of neutral into a driving range.

If the downstream range group is in neutral when a request is made to switch the downstream range group, then in a first embodiment of the invention it is provided that to engage a gear of the downstream range group the interlocking shifting element is actuated when the rotation speed of the output shaft of the main transmission has reached a shifting rotation speed of the downstream range group. By closing the shifting elements of the reversing gear in the main transmission, a torque with a negative rotation direction can be applied to the output shaft of the main transmission, with the result that the output shaft of the main transmission is braked. By braking the output shaft of the main transmission, a rotation speed of the output shaft of the main transmission that is too high to enable shifting of the downstream range group can be avoided, which high rotation speed would otherwise be produced in neutral as the result of drag losses in the main transmission.

If the rotation speed of the output shaft of the main transmission has reached the shifting rotation speed for engaging the driving range in the downstream range group, then the driving range of the downstream range group can be engaged by actuating the interlocking shifting element of the downstream range group.

To switch the interlocking shifting element of the downstream range group, the rotation speed of the output shaft of the main transmission can be kept within a defined rotation speed range for shifting the downstream range group, by virtue of controlled pressurizing of the partially closed shifting element of the main transmission. Consequently, to shift the downstream range group from neutral into the driving range to be engaged, the interlocking shifting element of the downstream range group can be actuated when the rotation speed of the output shaft of the main transmission is within the said rotation speed range. The shifting rotation speed of the downstream range group can for example be in a rotation speed range of 10 rpm to 60 rpm, preferably a rotation speed range of 20 rpm to 40 rpm.

In that way, the probability is reduced that during the engagement of the driving range of the downstream range group that is to be engaged, a tooth-on-tooth position might occur leading to rattling or a direct coupling. Thus, the interlocking shifting element can be shifted from neutral into the driving range to be engaged, with little noise and low wear.

A tooth-on-tooth position resulting in rattling occurs when shifting claws of the interlocking shifting element with different rotation speeds slide over one another. Owing to the sliding of the shifting claws over one another, the engagement of the driving range to be engaged is impeded. Since the shifting of the downstream range group takes place when the rotation speed of the output shaft is in the rotation speed range defined for the shifting of the downstream range group, rattling of the interlocking shifting element when the new driving range is engaged in the downstream range group, which would result in a typical noise emission, can be avoided. This increases shifting comfort.

In contrast, a tooth-on-tooth position in the form of a direct coupling occurs when shifting claws of the interlocking shifting element stick to one another and rotate at the same rotation speed. Then, owing to the sticking of the shifting claws of the interlocking shifting element to one another, the new driving range cannot be engaged in the downstream range group. Since the rotation speed of the output shaft is kept within the rotation speed range defined for shifting the downstream range group, the probability that a direct coupling might occur while engaging the new driving range in the downstream range group can be reduced.

However, if a tooth-on-tooth position does occur at the interlocking shifting element of the downstream range group, then the partially closed shifting element of the main transmission can be fully opened. In that way, the tooth-on-tooth position can be resolved by virtue of the then rotating output shaft of the main transmission.

A rotation speed of an output shaft of the main transmission can be determined, and the shifting elements of the reversing gear in the main transmission are then at least partially closed if the rotation speed of the output shaft of the main transmission, determined when a shift in the downstream range group has been called for, is higher than a maximum permitted shifting rotation speed for shifting the downstream range group. The rotation speed of the output shaft can be determined, for example, by means of a rotation speed sensor. In that way, the shifting elements of the reversing gear can be selectively activated in order to brake the output shaft of the main transmission, if the rotation speed of the output shaft of the main transmission exceeds a maximum permitted shifting rotation speed.

On the other hand, if when a shift of the downstream range group is called for the downstream range group is in an engaged driving range, then in a further embodiment of the invention it is provided that in order to be disengaged, the driving range of the interlocking shifting element of the downstream range group is actuated when the shifting element is free or almost free from load. By closing the shifting elements of the reversing gear in the main transmission, the torque transmitted to the downstream range group by virtue of the prevailing drag losses in the main transmission, and therefore also the load acting on the interlocking shifting element when the driving range is disengaged, are reduced. Thus, the interlocking shifting element of the downstream range group becomes free from load or almost so, whereby shifting of the interlocking shifting element from the driving range to be disengaged into neutral can be carried out quietly and with little wear. In this case, the interlocking shifting element can be actuated by a disengagement force that brings about the disengagement of the interlocking shifting element when it is free or almost free from load.

A transmission condition of the main transmission can be determined, wherein the shifting elements of the reversing gear in the main transmission are in particular at least partially closed, if a shift request to shift the downstream range group is received while the transmission condition of the main transmission is such that drag losses are high. When drag losses in the main transmission are high while the downstream range group is in neutral, then, owing to the high drag losses, the output shaft of the main transmission will always be accelerated to a rotation speed above the shifting rotation speed of the downstream range group. If the downstream range group is in an engaged driving range, the high drag losses in the main transmission give rise to a load that acts upon the interlocking shifting element of the downstream range group, which load impedes the disengagement of the driving range at a maximum permitted disengagement force. Accordingly, the shifting elements of the reversing gear in the main transmission can be selectively actuated if the transmission condition of the main transmission is such that drag losses are high. The transmission is in a condition with high drag losses in particular when the vehicle transmission has not yet reached a high enough temperature. When the transmission is cool, the lubricant in it (usually transmission oil) has a relatively high viscosity. Inter-component friction and splash losses in the transmission are correspondingly high, whereby an undesired torque is transmitted to the output shaft of the main transmission. Thus, such a transmission condition is in particular equivalent to a "cold" vehicle transmission. This transmission condition may exist if, for example, the transmission lubricant is lower than a particular temperature, such as 40° C.

The controlled pressurization of the partially closed shifting element in the main transmission, i.e., the pressure at which the shifting element is actuated to operate with slip in order to bring the rotation speed of the output shaft of the main transmission to the rotation speed range defined for shifting the downstream range group or keep it in that range, can vary depending on a prevailing transmission temperature. Thus, for the control of the partially closed shifting element of the main transmission, a temperature dependence of the drag losses in the main transmission is taken into account. As the transmission temperature, for example, a temperature of the transmission oil in the main transmission can be taken into account. The transmission temperature can be detected by means of a temperature sensor.

If the powershiftable main transmission is designed such that when the reversing gear is engaged a plurality of the shifting elements in the main transmission are closed, then it can be provided that to assist the shifting of the downstream range group one of the shifting elements of the reversing gear is partially closed and the other shifting element or shifting elements of the reversing gear is/are completely closed. For example, if three shifting elements are closed in order to engage the reversing gear, then it is preferably provided that to assist shifting of the downstream range group that two of the shifting elements of the reversing gear are completely closed while the third shifting element of the reversing gear is only partially closed.

The pressurizing of the shifting elements of the reversing gear of the main transmission in order to assist the shifting of the downstream range group can be terminated if certain termination conditions exist. Thus, for example, an actuation of the shifting element that is operating in slip can be terminated if the pressure with which that shifting element is acted upon reaches or exceeds a limit value. In that way, it can reliably be avoided that the reversing gear is engaged inadvertently and that the motor vehicle moves in the reverse direction owing to a torque transfer via the transmission. It can also be provided that the actuation of the shifting element operating in slip is terminated if a parameter of a vehicle brake reaches or falls below a limit value, such that the vehicle brake is released, or when a limit value of a vehicle speed is reached or exceeded. In that way, it can be recognized that the vehicle should no longer be operated at a standstill or in a speed range close to standstill and that the shifting of the downstream range group should be discontinued or not carried out. The actuation of the shifting element operating in slip should also be terminated if a torque transmitted by the hydrodynamic starting element reaches or exceeds a limit value. In that way an undesired forced closure by way of the main transmission can be prevented. Furthermore, when a maximum time duration for shifting the downstream range group is reached or exceeded, the actuation of the shifting element operating in slip can be terminated.

The proposed method enables reliable shifting of a downstream range group of a transmission with a powershiftable main transmission, even if drag losses in the main transmission would negatively affect the shifting of the downstream range group. The downstream range group can be shifted quietly and with little wear.

The proposed method is controlled by the also proposed control unit, which, for example, can be in the form of a transmission control unit. This means that the method is carried out by the control unit. Accordingly, the proposed control unit is specially designed to carry out the method with the respectively indicated steps. For this, the control unit comprises, in particular, an input, an output and calculation means. In particular, the control unit also comprises for the purpose a storage medium, for example a data memory, in which the commands specially required for the implementation are stored. The input of the control unit is designed such that the necessary information can be supplied to the control unit by way of the input, for example the temperature of the main transmission, a brake pressure of the vehicle's brakes, and/or the rotation speed of the output shaft of the main transmission. The output of the control unit is designed to emit the control signals required for actuating the shifting elements, for example signal for the opening and closing of valves of the shifting elements, whereby the shifting elements can be pressurized. The calculation means carries out the commands stored in the storage medium in such manner that the incoming information is processed, and the corresponding control signals for the shifting elements are emitted. The calculation means are in particular a microprocessor.

A computer program according to the invention is designed to enable a control unit to carry out the method according to the invention or a preferred further development thereof when the computer program is run in the control unit. In this connection, the object of the invention also includes a computer-readable medium on which the aforesaid computer program is stored and from which it can be called up.

BRIEF DESCRIPTION OF THE DRAWINGS

Below, the invention is explained in greater detail with reference to figures from which further preferred embodiments and features of the invention can be seen. The figures show.

DETAILED DESCRIPTION

Figure 1:
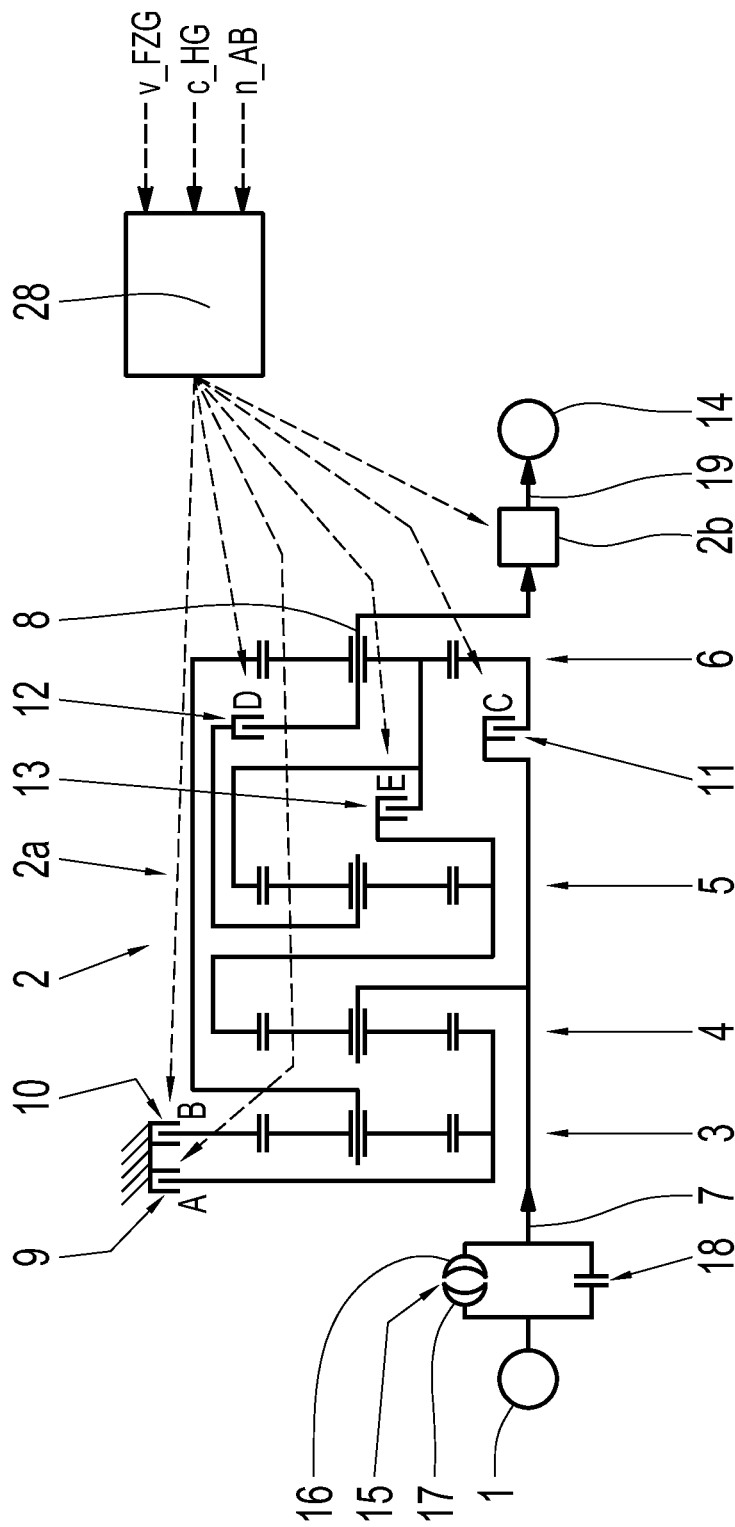
FIG. 1: An example of a drivetrain scheme of a motor vehicle, with an example of a transmission comprising a main transmission and a downstream range group.

FIG. 1 shows, very schematically, an example of a drivetrain of a motor vehicle. The drivetrain of FIG. 1 comprises a drive aggregate 1, a transmission 2, and a drive output 14, the transmission 2 being connected between the drive aggregate 1 and the drive output 14. The drive aggregate 1 can be, for example, an internal combustion engine or an electric motor.

The transmission 2 comprises a main transmission 2a, which provides a number of forward gears and a reversing gear, and a downstream range group 2b connected downstream on the drive input side, which provides a first driving range and a second diving range. The first driving range can correspond to a slow driving range and the second gear to a fast driving range. The first driving range can be an all-wheel driving range and the second driving range can be a non-all-wheel driving range.

Between the drive aggregate 1 and the transmission 2, namely—in the example embodiment shown—between the drive aggregate 1 and the main transmission 2a, there is connected a hydrodynamic starting element with a converter 15 and a converter bridging cutch 18. A converter comprises a turbine 16, wherein the turbine 16 in the example embodiment shown is coupled rotationally fixed to an input shaft 7 of the main transmission 2a. In addition, a converter 15 comprises a pump 17. The pump 17 is coupled rotationally fixed to the drive aggregate 1. The structure of such a converter 15 is known to those familiar with the subject, to whom this is addressed.

Between the main transmission 2a of the transmission 2 and the drive output 14 is connected the downstream range group 2b of the transmission 2, this downstream range group 2b being coupled to a drive output shaft 8 of the main transmission 2a.

In the example embodiment shown, the main transmission 2a of the transmission 2 comprises a plurality of gearsets 3, 4, 5, and 6, and a plurality of frictional shifting elements 9, 10, 11, 12, and 13 which co-operate with the said gearsets 3, 4, 5, and 6, wherein the two shifting elements 9 and 10 are also called shifting elements A and B respectively, and wherein the shifting elements 11, 12, and 13 are also called shifting elements C, D, and E respectively. The shifting elements A and B and also the shifting elements C, D, and E are frictional shifting elements in each case, namely, such that the shifting elements A and B are brakes and the shifting elements C, D. and E are clutches. The shifting elements A and B are disk brakes and the shifting elements C, D. and E are disk clutches.

In FIG. 1 a control unit 28 is also shown, which serves to actuate the shifting elements A, B, C, D, E of the main transmission 2a and of the downstream range group 2b. Thus, the control unit 28 enables the shifting elements of the transmission 2 to be selectively opened and closed. Thereby, the gear appropriate for the respective situation or the gear called for by a driver of the vehicle is engaged. For that purpose, the requisite information is sent to the control unit 28 by way of the control unit's input. The control unit 28 processes this information and emits corresponding signals for actuating the shifting elements of the transmission 2 by way of the control unit's output. However, it is also conceivable for a respective control unit of its own to be associated with the main transmission 2a and with the downstream range group 2b, which enable the actuation of the shifting elements in the respective parts of the transmission. These control units can then communicate with one another, for example by way of a CAN (Controller Area Network) data bus.

Among other things, and only as an example, the information signals v_FZG, c_HG and n_AB are sent to the control unit 28. The information signal v_FZG is a speed of the motor vehicle, by way of which a standstill or a speed range close to standstill of the motor vehicle can be recognized. The speed signal v_FZG can be determined, for example, by a speed sensor or from the rotation speed of the output shaft of the downstream range group. The information c_HG is a temperature signal that represents the transmission temperature of the main transmission 2a. The temperature signal c_HG can be determined, for example, by a temperature sensor of the transmission 2. The information n_AB is a rotation speed signal that represents the rotation speed at the output shaft 8 of the main transmission 2a. The control unit 28 is also informed of a shift request to shift the downstream range group 2b when that is called for by the driver of the motor vehicle or by the control unit.

Usually, the shifting elements of the main transmission 2a are actuated by a pressure medium. For that purpose, each shifting element A, B, C, D, E of the main transmission 2 is associated with an actuation piston that can be acted upon individually by the pressure of the pressure medium. For this, the valves associated with the actuation pistons are operated by the control unit 28. As the pressure medium, with the main transmission 2a shown in FIG. 1 the lubricant of the main transmission 2a (transmission oil) is usually used.

Figures 2, 3:
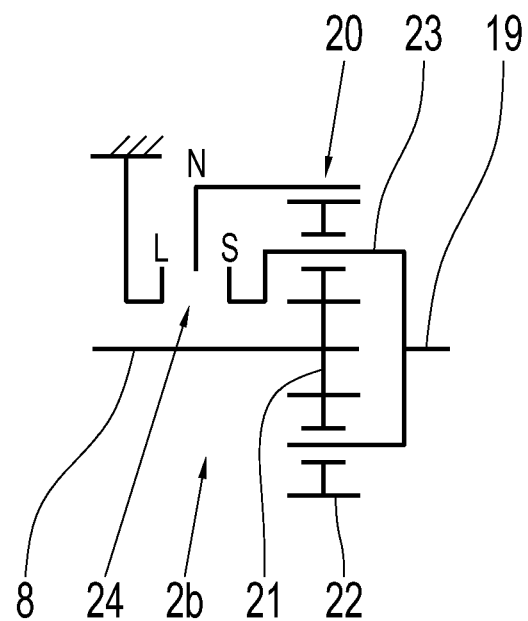
FIG. 2: A shifting matrix of the main transmission in FIG. 1.
FIG. 3: A possible design of the downstream range group in FIG. 1.

FIG. 2 shows a shifting matrix for the main transmission 2a of the transmission 2 in FIG. 1. From FIG. 2 it can be seen that with the main transmission 2a of the transmission 2 in FIG. 1 a total of eight frictional and hence traction-force-transmitting forward gears D1 to D8 and one frictional and hence traction-force-transmitting reversing gear R can be obtained. In each of these traction-force-transmitting gears D1 to D8 and R, a defined first number of shifting elements, namely, three shifting elements of the main transmission 2a are closed, whereas on the other hand, a defined second number of shifting elements, namely, two shifting elements of the main transmission 2a are in each case open in each traction-force-transmitting and hence frictional gear.

The shifting elements of the main transmission 2a which are closed in each respective frictional and hence traction-force-transmitting gear, are indicated by spots in FIG. 2. For example, in forward gear D1 of the main transmission 2a the shifting elements A, B. and C are closed and in forward gear D2 of the main transmission 2a the shifting elements A, B, and E are closed. In the reversing gear R of the main transmission 2a the shifting elements A, B. and D are closed. The shifting elements that are closed in forward gears D3, D4, D5, D6, D7, and D8 of the main transmission 2a can be seen in the same way in the shifting matrix of FIG. 2.

As already stated, the downstream range group 2b is connected between the output shaft 8 of the main transmission 2a and the drive output 14. In this case, as shown as an example in FIG. 3, the downstream range group 2b can be made such that as in FIG. 3 the downstream range group 2b comprises a planetary gearset 20 and an interlocking shifting element 24. The output shaft 8 of the main transmission 2a is coupled to a sun gear of the planetary gearset 20. The drive output 14 is coupled to a web 23 of the planetary gearset 20 by way of an output shaft 19 of the downstream range group 2b. Depending on the shift position of the interlocking shifting element 24, a ring gear 22 of the planetary gearset 20 is either fixed to the housing in the slow driving range L or coupled to the web 23 in the fast driving range S.

Figure 4:
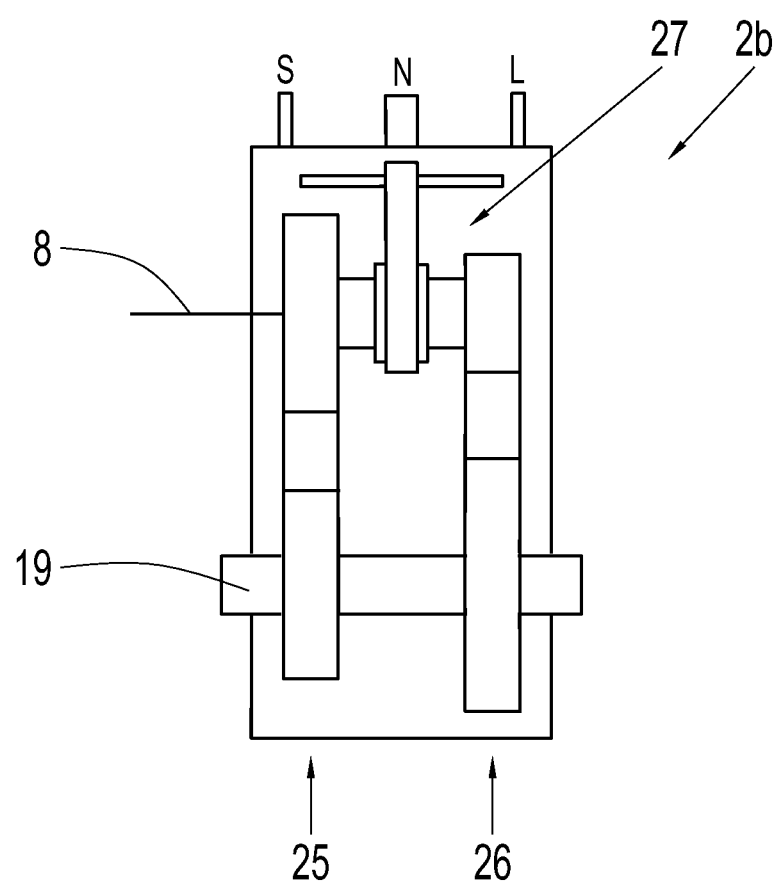
FIG. 4: An alternative design of the downstream range group in FIG. 1.

FIG. 4 shows an alternative design of the downstream range group 2b which, otherwise than shown in FIG. 3, is not of planetary design but rather of spur gear design. Thus, the downstream range group 2b in FIG. 4 comprises two spur gear stages 25 and 26, and an interlocking shifting element 27. Depending on the shift position of the interlocking shifting element 27, the output shaft 8 of the main transmission 2a is coupled to the output shaft 19 of the downstream range group 2b either by way of the spur gear stage 25 or by way of the spur gear stage 26.

The invention now relates to a method for the safe and reliable shifting of the downstream range group 2b of the transmission 2, which in its the main transmission 2a comprises frictional shifting elements 9, 10, 11, 12, and 13. For this it is provided that when the motor vehicle, with its drive aggregate 1 running, is at a standstill or in a near-standstill speed range, the powershiftable main transmission 2a is in neutral and there is a shift request to shift the downstream range group 2b, first of all the shifting elements 9, 10, and 12 of a reversing gear R of the main transmission 2a are actuated in order to assist the shifting of the downstream range group 2b.

Figure 5:
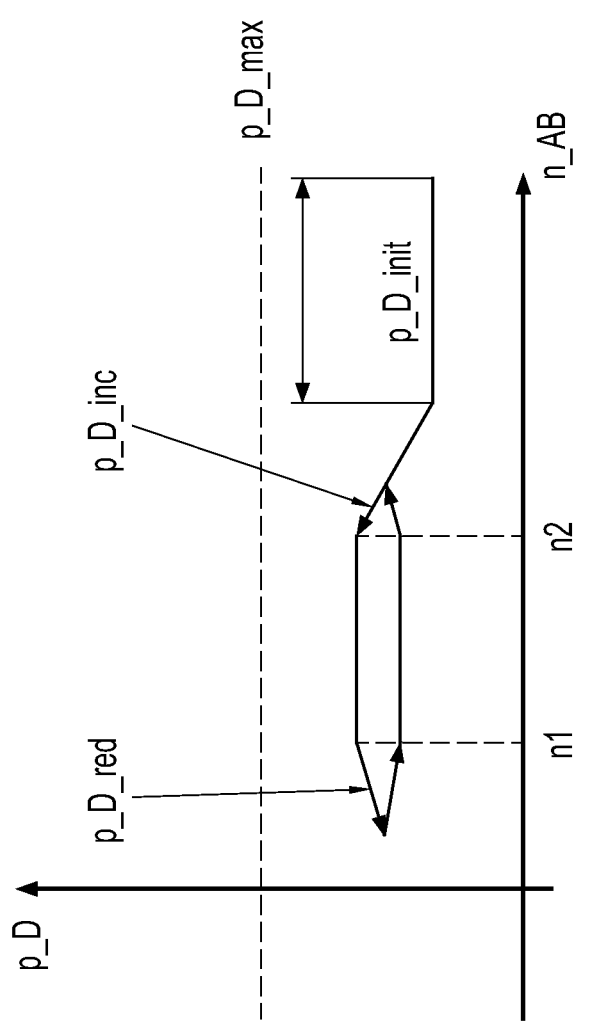
FIG. 5: An example of pressure variations in the partially closed shifting element of the main transmission for braking the output shaft of the main transmission to a rotation speed suitable for shifting the downstream range group.

In this embodiment of the main transmission 2a, for that purpose the shifting elements 9, 10 in the form of disk brakes can be fully closed whereas the other shifting element 12 of the reversing gear R is partially closed in order to brake the output shaft 8 of the main transmission 2a. For this, FIG. 5 shows an example of a pressure variation of the partially closed shifting element 12 of the main transmission 2a for braking the output shaft 8 of the main transmission 2a to a rotation speed n_AB suitable for engaging the driving range of the downstream range group 2b.

Thus, the frictional shifting element 12 of the main transmission 2a can already be acted upon in neutral with a pressure p_D_init in order to limit the rotation speed n_AB of the output shaft 8 of the main transmission 2a. When a shift request to shift the downstream range group 2b is made the pressure p_D in the shifting element 12 is increased, whereby the output shaft 8 is braked. As shown in FIG. 5 this takes place along a pressure ramp p_D_inc until the rotation speed n_AB of the output shaft 8 has reached a rotation speed n2 that is suitable for shifting the downstream range group 2b, for example 40 rpm. Thereafter, the driving range of the downstream range group 2b is changed.

The pressure in the partially closed shifting element 12 of the main transmission 2a is maintained until the rotation speed n_AB of the output shaft 8 reaches a lower rotation speed limit value n1, or the driving range to be engaged in the downstream range group 2b is engaged.

If the rotation speed falls below a lower rotation speed value n1, for example 20 rpm, before the driving range to be engaged in the downstream range group 2b has been engaged, the probability that while engaging the new driving range a tooth-on-tooth position will occur increases. Accordingly, it is provided that when the rotation speed n_AB has reached the said lower limit value n1, the pressure p_D in the partially closed shifting element 12 of the main transmission 2a is reduced. Finally, the result of this is that the rotation speed n_AB of the output shaft 8 of the main transmission 2a increases again and a rotation speed difference desired for engaging the new driving range is produced at the shifting element 24, 27.

Consequently, by the controlled pressurization of the partially closed shifting element 12 of the main transmission 2a the rotation speed n_AB of the output shaft 8 of the main transmission 2a can be kept within a defined rotation speed range between the rotation speeds n1 and n2, so that the driving range to be engaged can be reliably engaged from neutral.

INDEXES

1 Drive aggregate
2 Transmission
2a Main transmission
2b Downstream range group
3 Gearset
4 Gearset
5 Gearset
6 Gearset
7 Input shaft of the main transmission
8 Output shaft of the main transmission
9 Shifting element A
10 Shifting element B
11 Shifting element C
12 Shifting element D
13 Shifting element E
14 Drive output
15 Converter
16 Turbine
17 Pump
18 Converter bridging clutch
19 Output shaft of the downstream range group
20 Planetary gear system
21 Sun gear
22 Ring gear
23 Web
24 Shifting element
25 Spur gear stage
26 Spur gear stage
27 Shifting element
28 Control unit

The invention claimed is:

1. A method for operating a transmission arranged in a drivetrain of a motor vehicle between a drive aggregate and a drive output, the method comprising:
providing the transmission comprising
a hydrodynamic starting element;
a powershiftable main transmission having a plurality of forward gears, at least one reversing gear, and a plurality of frictional shifting elements, wherein in each gear a first number of shifting elements are closed and a second number of shifting elements are open; and
a downstream range group connected downstream from the main transmission, the downstream range group comprising at least one interlocking shifting element (and configured be shifted between a first driving range, a second driving range, and a neutral position;

running the drive aggregate with the motor vehicle at a standstill or in a speed range close to standstill and with the main transmission in neutral;

receiving a shift request to change the downstream range group;

partially closing the shifting elements of a reversing gear in the main transmission; and subsequently changing the driving range of the downstream range group.

2. The method according to claim 1, comprising:

shifting the downstream range group to the neutral position;

determining that a rotation speed of an output shaft of the main transmission has reached a shifting rotation speed of the downstream range group; and actuating the interlocking shifting element to engage a driving range of the downstream range group.

3. The method according to claim 2, comprising:

maintaining the rotation speed of the output shaft of the main transmission within a defined rotation speed range for engaging a driving range of the downstream range group by controlled pressurization of a partially closed shifting element.

4. The method according to claim 3, comprising:

determining that the rotation speed of the output shaft of the main transmission is within the defined rotation speed range; and actuating the interlocking shifting element of the downstream range group to engage a driving range of the downstream range group.

5. The method according to any of claim 2, comprising:

determining the rotation speed of the output shaft of the main transmission;

determining that the rotation speed of the output shaft of the main transmission is higher than a maximum shifting rotation speed permitted for shifting the downstream range group; and at least partially closing the shifting elements of the reversing gear in the main transmission.

6. The method according to claim 1, comprising:

engaging a driving range in the downstream range group;

determining that the shifting element is substantially free from load; and actuating the interlocking shifting element of the downstream range group to disengage the driving range.

7. The method according to claim 1, comprising:

determining a transmission condition of the main transmission;

determining that the transmission exhibits high drag losses; and at least partially closing the shifting elements of the reversing gear in the main transmission.

8. The method according to claim 1, comprising:

varying, as a function of transmission temperature, a pressure of the partially closed shifting element of the main transmission.

9. The method according to claim 1, comprising:

determining that a plurality of shifting elements of the main transmission are closed;

partially closing one of the shifting elements of the reversing gear;

fully closing another shifting element or shifting elements of the reversing gear; and engaging the reversing gear.

10. The method according to claim 1, comprising:

determining that (i) the pressure in the partially closed shifting element of the reversing gear reaches or exceeds a limit value, (ii) a parameter of a vehicle brake reaches or falls below a limit value, (iii) a vehicle speed reaches or exceeds a limit value, (iv) a torque transmitted by the hydrodynamic starting element reaches or exceeds a limit value, or (v) a maximum time duration for shifting the downstream range group is reached or exceeded; and terminating pressurization of shifting elements of the reversing gear of the main transmission to assist the shifting of the downstream range group.

11. A control unit configured to carry out a method according to claim 1.

12. A computer program product having executable code configured to carry out the method according to claim 1 when the computer program is executed by a control unit.

13. A transmission of a motor vehicle, comprising a main transmission and a downstream range group connected downstream from the main transmission, wherein the transmission comprises a control unit configured to carry out the method of claim 1.

14. A motor vehicle comprising the transmission of claim 13.

* * * * *